(12) United States Patent  
Abramovitch

(10) Patent No.: US 8,074,291 B2  
(45) Date of Patent: Dec. 6, 2011

(54) HARMONIC CORRECTING CONTROLLER FOR A SCANNING PROBE MICROSCOPE

(75) Inventor: Daniel Yves Abramovitch, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 107 days.

(21) Appl. No.: 12/697,183

(22) Filed: Jan. 29, 2010

(65) Prior Publication Data

US 2011/0191917 A1   Aug. 4, 2011

(51) Int. Cl.
*G01N 13/16* (2006.01)
*G01B 5/28* (2006.01)
(52) U.S. Cl. .............. 850/1; 850/5; 850/11; 250/309; 73/105
(58) Field of Classification Search .............. 850/1, 5, 850/11; 250/309; 73/105
See application file for complete search history.

(56) References Cited

U.S. PATENT DOCUMENTS 5,723,775 A * 3/1998 Watanabe et al. ............... 73/105
2008/0277582 A1* 11/2008 Shi et al. ....................... 250/309

* cited by examiner

*Primary Examiner* — Nikita Wells

(57) ABSTRACT

A scanning probe microscope and method for operating the same to correct for errors introduced by a repetitive scanning motion are disclosed. The microscope includes an actuator that moves the probe tip relative to the sample in three directions. The actuator executes a repetitive motion, characterized by a repetitive motion frequency, in one of the directions, and changes a distance between the sample and the probe tip in a second one of the directions. A probe position signal generator generates a probe position signal indicative of a position of the probe tip relative to the cantilever arm. A probe signal correction generator generates a corrected probe position signal by correcting the probe position signal for errors introduced by the repetitive motion. A controller maintains the probe tip in a fixed relationship with respect to the sample in the second one of the dimensions based on the corrected probe position signal.

12 Claims, 5 Drawing Sheets

HARMONIC CORRECTING CONTROLLER FOR A SCANNING PROBE MICROSCOPE

BACKGROUND OF THE INVENTION

Scanning probe microscopes are a class of imaging techniques in which a tip that interacts locally with a sample is scanned over the surface of the sample to generate a three-dimensional image representing the properties of the surface. For example, in atomic force microscopy, the surface interaction force between the probe tip and the sample are measured at each point on the sample. The tip has a very small end and is mounted on the end of a cantilevered arm. As the tip is moved over the surface of the sample, the arm deflects in response to the changes in topology of the surface. Images are typically acquired in one of two modes. In the contact or constant force mode, the tip is brought into contact with the sample and the tip moves up and down as the tip is moved over the surface. The deflection of the arm is a direct measure of force and topographical variations. A feedback controller measures the deflection and adjusts the height of the probe tip so as to maintain constant force between the cantilevered probe and the surface, i.e., the arm at a fixed deflection. The height of the probe tip as a function of position can then be used to create an "image" of the surface of the sample.

In the AC, or non-contact mode, the tip and arm are oscillated at a frequency near the resonant frequency of the arm. The height of the tip can be controlled such that the tip avoids contact with the sample surface, sampling short-range tip/sample forces. Alterations in the oscillation frequency from short range forces between the tip and the sample result in changes in the oscillations of the tip. Alternatively, the tip can be allowed to make light intermittent contact with the sample only at the bottom of the oscillation cycle. Contact between the probe tip and the sample results in an alteration of the amplitude, phase and/or frequency of the oscillation. The controller adjusts the height of the probe over the sample such that the oscillation amplitude, phase and/or frequency is kept at a predetermined constant value. Since the tip is not in constant contact with the sample, the sheer forces applied to the sample are significantly less than in the mode in which the tip is in constant contact. For soft samples, this mode reduces the damage that the tip can inflict on the sample and also provides a more accurate image of the surface in its non-disturbed configuration.

In all of these modes, the image is constructed one point at a time and limited by the rate at which the tip can be moved relative to the sample, as well as the time required for the servo loop to reposition the tip vertically to maintain the distance between the surface and the tip. Hence, the time to acquire an entire image can be several minutes or longer, since the image acquisition process depends on mechanically moving the sample being scanned relative to the measurement probe. In one class of system, the probe is moved over the sample in a raster scanning pattern that zig-zags back and forth over the sample until the entire sample area has been measured. The acquisition time depends on the resolution desired in the image; at high resolutions, the total scanning time can be very long. Such long acquisition times are tolerable for stationary samples that do not change over the long sample acquisition time. However, the use of scanning probe microscopy on dynamic systems, as in the case of measuring transient events in biological samples is inhibited by excessive sampling time, since the phenomena of interest often occur in times that are small compared to the image acquisition time.

Hence, scanning schemes that reduce the total scanning time have been sought. For example, more complex servo control algorithms are utilized to minimize the response time for tracking changes in topography at each measurement point on the sample. In a raster scan mode, the tip is moved rapidly in one direction and more slowly in the other direction. To simplify the following discussion, it will be assumed that the fast direction is the x-direction and that the slow direction is the y-direction. The repetitive motion generates signals at the x scan frequency and harmonics thereof in the detection signal. These harmonics can interfere with the tip height servo mechanism, and hence, lead to errors in the height measurements or a requirement that the scan speed be significantly reduced to reduce these errors. It is understood that there is repetitive motion along the slower y-direction and that this can also result in repetitive errors in the detected signal that can be addressed using this invention.

SUMMARY OF THE INVENTION

The present invention includes a scanning probe microscope that compensates for errors introduced by a repetitive scanning motion, and a method for operating a scanning probe microscope to compensate for such errors. The scanning probe microscope includes a probe mount and an actuator, the probe mount being adapted to receive a probe having a tip that moves in response to an interaction between the tip and a local characteristic of a sample, the probe being mounted on a cantilever arm. The actuator moves the probe tip relative to the sample in three directions. The actuator executes a repetitive motion, characterized by a repetitive motion frequency, in one of the directions, and changes a distance between the sample and the probe tip in a second one of the directions. A probe position signal generator generates a probe position signal indicative of a position of the probe tip relative to the cantilever arm. A probe signal correction generator generates a corrected probe position signal by correcting the probe position signal for errors introduced by the repetitive motion. A controller maintains the probe tip in a fixed relationship with respect to the sample in the second one of the dimensions based on the corrected probe position signal.

In one aspect of the invention, the probe signal correction generator measures a component of the probe position signal in at least one harmonic of the repetitive motion frequency and generates a correction signal based on the components.

In another aspect of the invention, the probe signal correction generator measures an average value for the probe position signal at each of a plurality of predetermined positions along the first direction.

DETAILED DESCRIPTION OF THE PREFERRED EMBODIMENTS OF THE INVENTION

Figure 1:
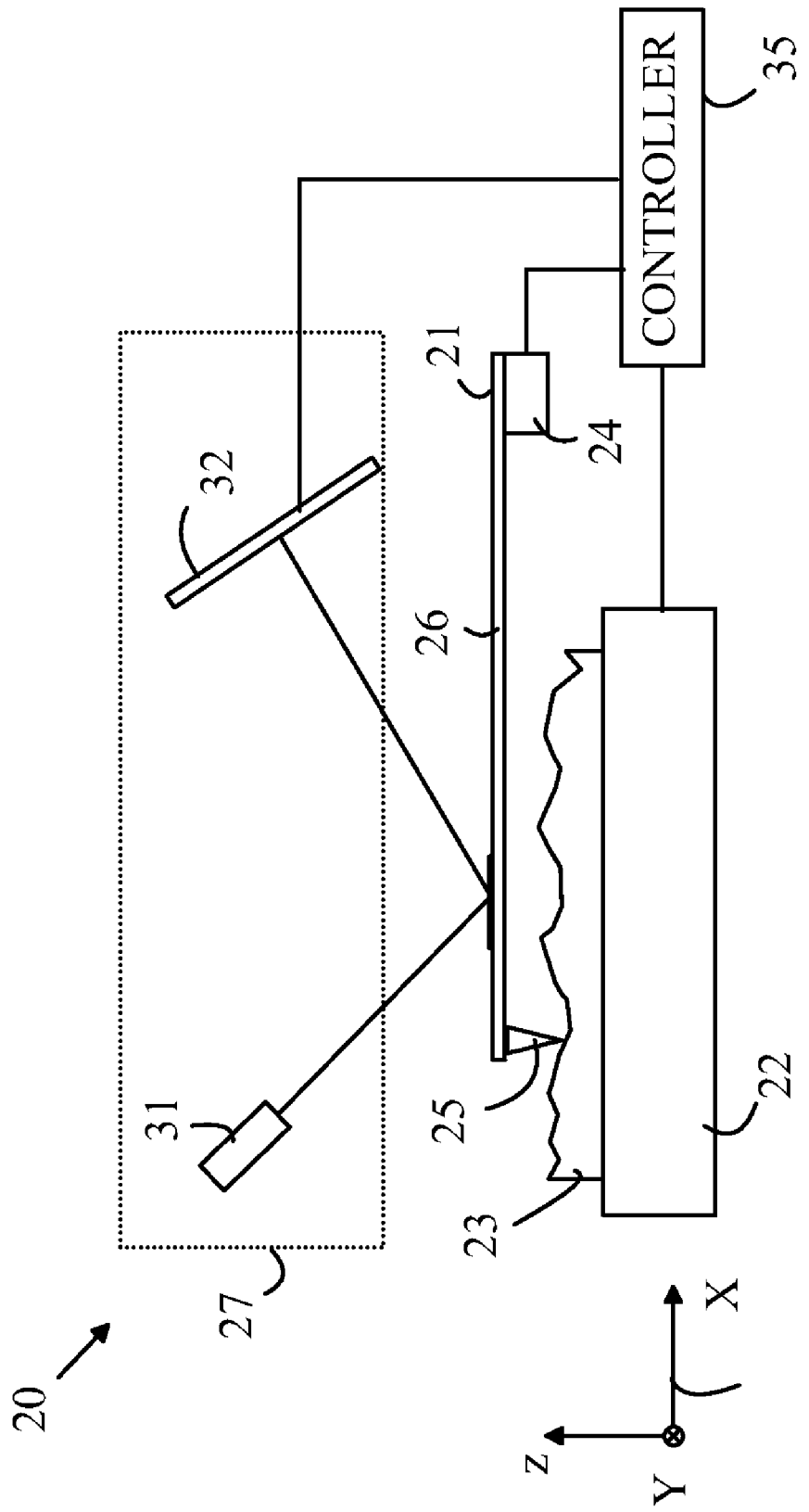
FIG. 1 which illustrates a typical atomic force microscope that utilizes the scanning probe microscope of the present invention.

The manner in which the present invention provides its advantages can be more easily understood with reference to FIG. 1, which illustrates a typical atomic force microscope that utilizes the scanning probe microscope of the present invention. Microscope 20 includes a probe assembly 21 and a stage 22 on which a sample 23 to be imaged is mounted. A combination of actuators move the stage and probe relative to one another in three orthogonal directions. In the case of microscope 20, stage 22 moves the sample in an x-y plane under the probe assembly 21. Probe assembly 21 is attached to a second actuator 24 that moves probe assembly 21 in a z-direction that is perpendicular to the x-y plane as shown in FIG. 1. However, embodiments that use other mechanisms to move the probe relative to the sample with the required three degrees of freedom could also be utilized.

Probe assembly 21 includes a tip 25 that is mounted on an arm 26 that can deflect in the z-direction in response to the interaction of the probe and the sample. The degree of deflection of arm 26 is measured by a detector 27. In the embodiment shown in FIG. 1, the detector 27 includes a light source 31 and photodetector 32. Light source 31 illuminates a reflector on arm 26, and the location of the reflected light is detected by photodetector 32. A servo loop is utilized by controller 35 to set the z-coordinate through actuator 24 such that the deflection of arm 26 is maintained at a predetermined value. The z-coordinate of the probe tip relative to the sample as a function of the (x,y) position of the stage provides a three-dimensional topological map of the sample surface.

Figure 2:
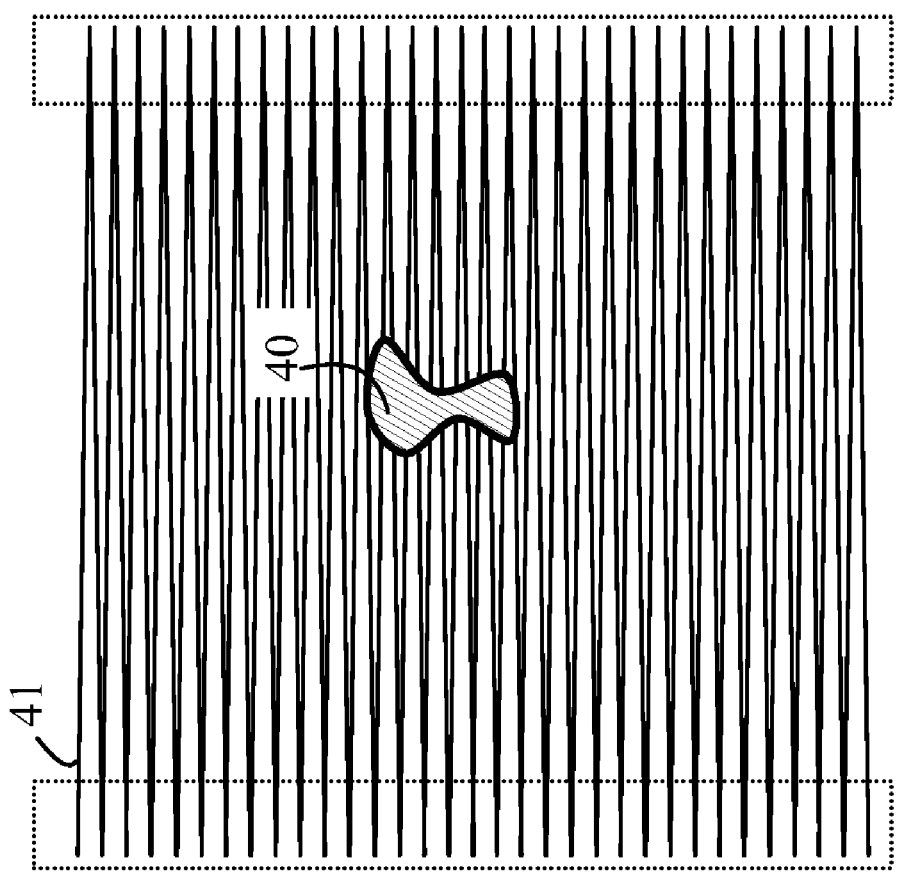
FIG. 2 illustrates one type of raster-scan pattern that is used in scanning an object with a prior art scanning probe microscope.

Refer now to FIG. 2, which illustrates one type of raster-scan pattern that is used in scanning an object 40 with a prior art scanning probe microscope. The pattern is essentially a continuous raster scan in which the probe moves along a ziz-zag path 41. The x-direction motion is cyclic while the y-direction increases or decreases slowly with time.

Figure 3:
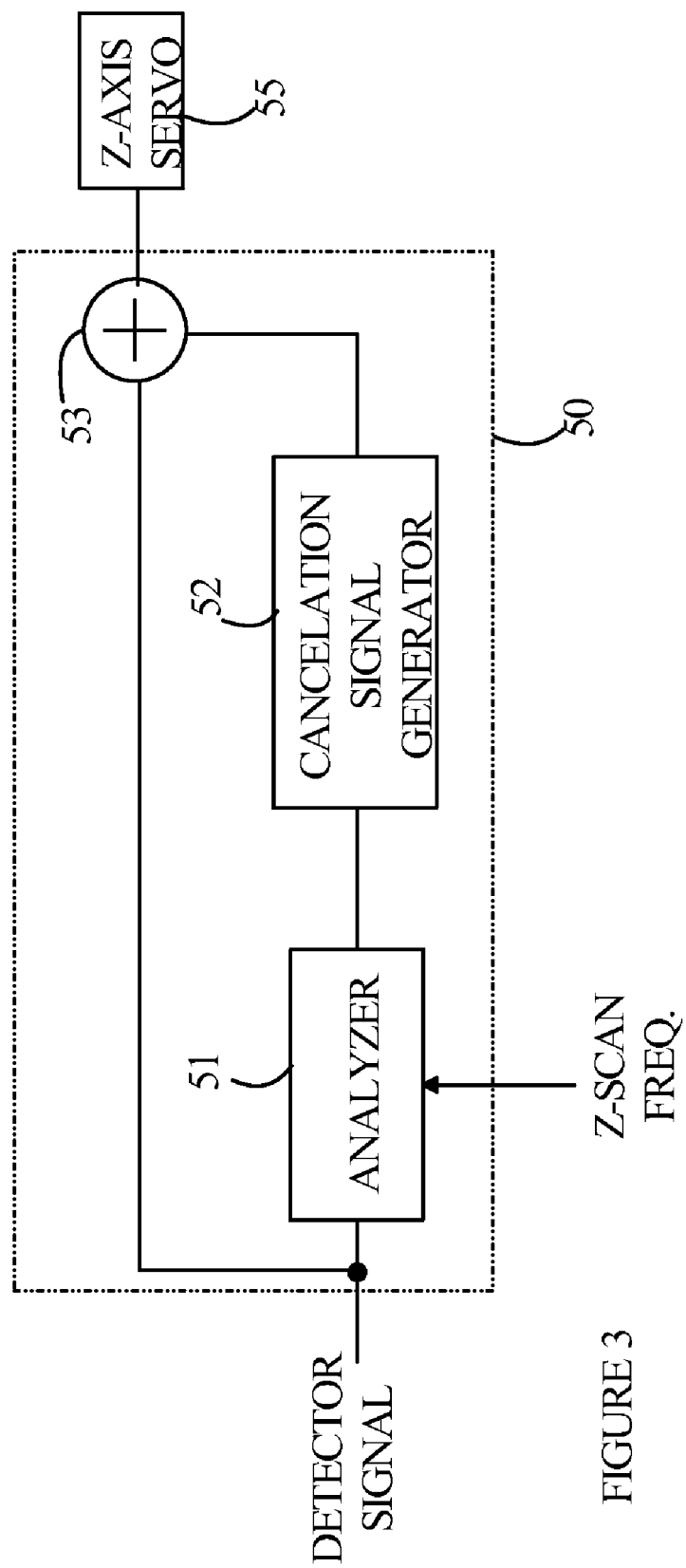
FIG. 3 illustrates one embodiment of a harmonic correction system according to the present invention.

In one aspect of the present invention, the amplitude and phase of the probe position signal at the harmonics of the x-scan frequency are measured and used to correct the probe position signal prior to the deflection signal reaching the servo drive. Refer now to FIG. 3, which illustrates one embodiment of a harmonic correction system according to the present invention. Harmonic correction system 50 includes an analyzer 51 that analyzes the probe position signal to determine the amplitude and phase of any components at harmonics of the x-scan frequency. The analyzer can be constructed in a variety of methods, including but not limited to, a set of lock-in amplifiers, one or more phase-locked loops that lock to the different spectral components of the probe position signal, or a more general Fourier analysis device that can measure the magnitude and phase of a signal across a broad spectrum of frequencies.

It is assumed that the only source of such harmonics is the x-scan drive, and hence, any components at these frequencies represent disturbances introduced by the x-scan drive. A cancellation signal generator 52 uses the detected amplitudes and phases to generate a cancellation signal that, when added to the probe position signal, cancels these components, and hence, corrects for these errors before the z-axis servo 55 uses the signal to set the height of the probe tip. For each component at a harmonic of the x-scan frequency, cancellation signal generator 52 generates a component having the same amplitude but is 180 degrees out of phase with the corresponding frequency component in the probe detector signal, which is then added to the probe position signal as shown at 53.

Figure 4:
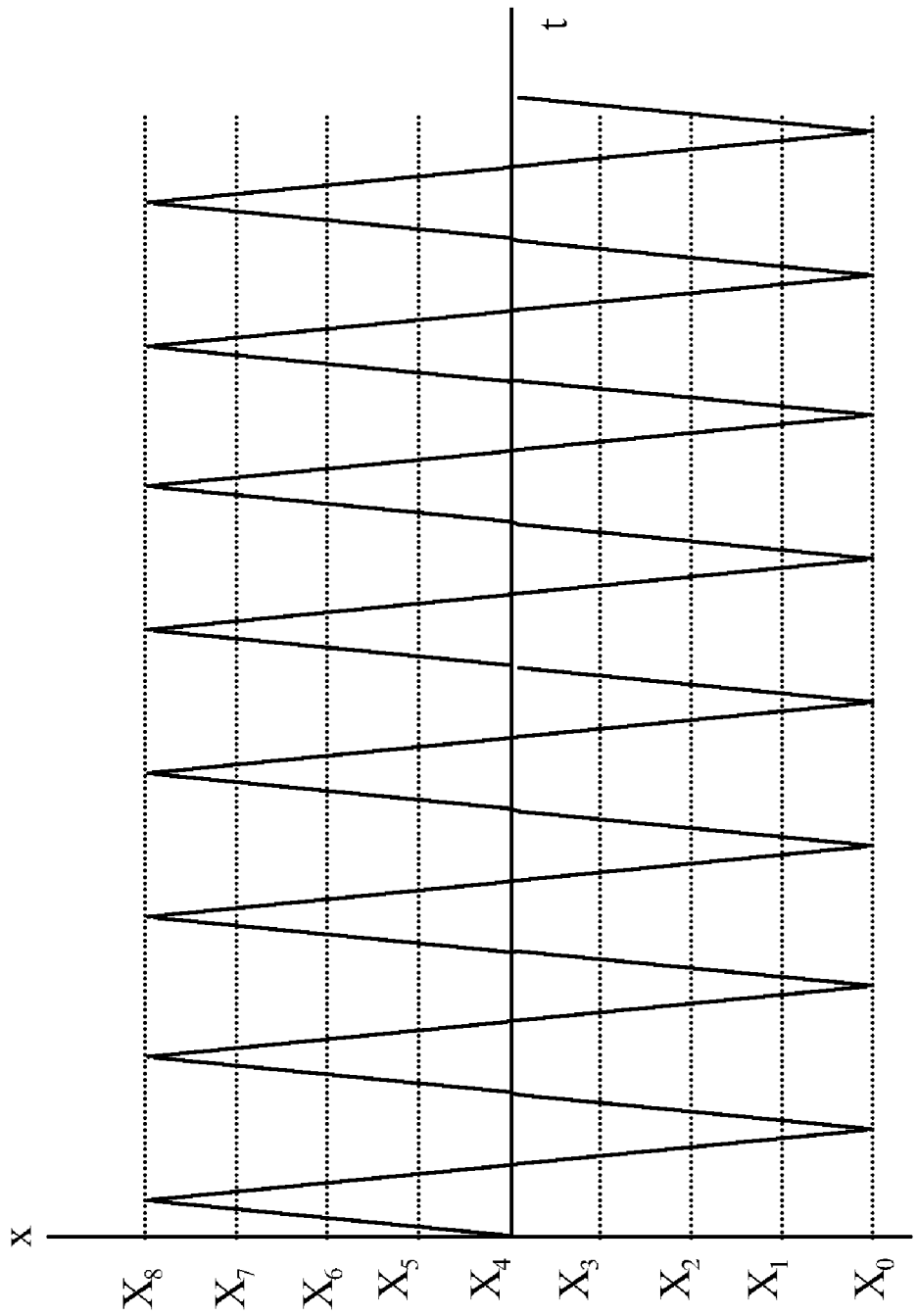
FIG. 4 illustrates the x-drive motion for a raster scanning pattern in which the x-drive moves at a constant speed between X0 and X8 and then reverses direction.

While the embodiment shown in FIG. 3 provides the desired cancellation, this embodiment can be economically unattractive in systems in which a large number of x-drive harmonics are present in the probe detector signal. The computational workload required to correct the probe detector signal for the harmonics of the x-drive that appear in the z direction can be significantly reduced by sampling the probe position signal at the same x-coordinates in each cycle of the x-drive. Refer now to FIG. 4, which illustrates the x-drive motion for a raster scanning pattern in which the x-drive moves at a constant speed between X0 and X8 and then reverses direction. In the absence of errors introduced by scanning the probe in x and y, the probe position represents the surface. Hence, the average error in the probe position signal at each of the points, X0, . . . , X8, should be zero if there were no errors introduced by the x-drive harmonics. Conversely, the long-term average of the probe position signal at each point is a correction that can be subtracted from the probe position signal at that x-coordinate to correct the probe position signal for the errors introduced by the x-drive harmonics.

Figure 5:
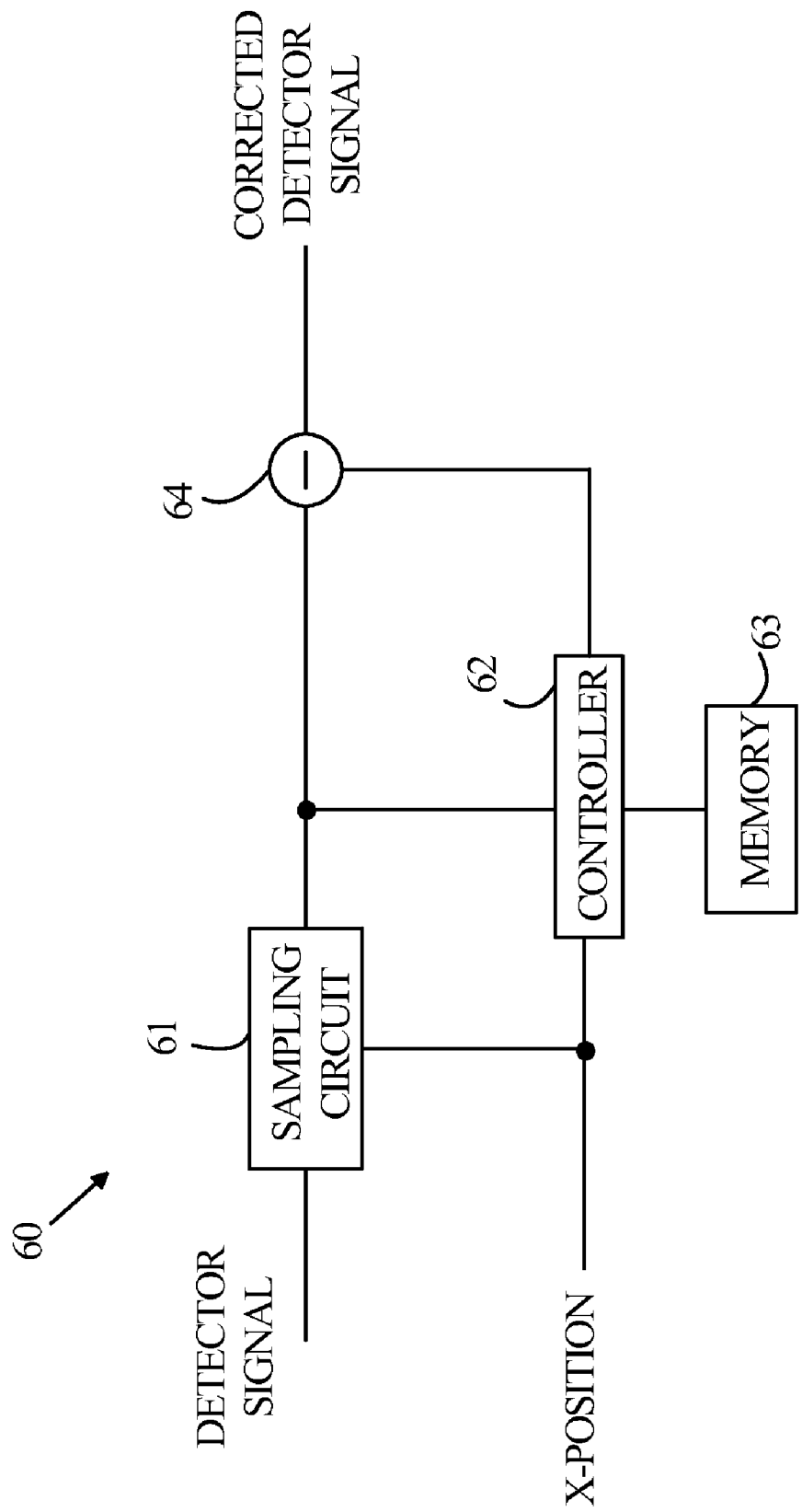
FIG. 5 illustrates one embodiment of a probe position signal correction circuit according to the present invention.

Refer now to FIG. 5, which illustrates one embodiment of a probe position signal correction circuit according to the present invention. Correction circuit 60 digitizes the probe position signal in a sampling circuit 61 at each of a predetermined number of x-coordinates. A controller 62 reads the digitized values and uses the values to update a long-term average for each of the predetermined coordinates. The long-term averages are stored in memory 63. Controller 62 also subtracts the long-term average for the current x-coordinate from the probe position signal to provide a corrected probe position signal as shown at 64.

In practice, the probe position signal is sampled at a fixed clock rate, not at predetermined points on the x-scan pattern. If the clock rate is an integer multiple of the x-scan frequency, the clock signal modulo the integer multiplier can be used as a proxy for the x-coordinate. In this case, the x-position signal is just the clock signal and controller 62 uses a counter to determine which long-term average to use in updating the correction factors.

Unfortunately, the sampling rate and the x-drive scan pattern do not satisfy this condition in many situations. In such situations, interpolation can be utilized. For example, controller 62 can maintain a table of long-term values of the probe position signal for a predetermined list of x-drive locations. The table is updated each time a new sampled value is received. To update the table, controller 62 also stores the uncorrected probe position signal values at each sample point for a predetermined number of previously received probe position signal samples. These values are interpolated to provide a value that is used to update the stored long-term averages. For example, in the case of linear interpolation, for each pair of sampled values that span one x-drive location in the list, controller 62 interpolates the two sampled values to arrive at an interpolated value that is then used to update the long-term average for that x-drive location. The correction signal then is generated by interpolating the table of long-term averages to match the instantaneous sampling positions of the current detector samples. The correction signal should be done in the same framing as the signal read from the surface. So, even though the long-term correction signal is based on a constant position sampling, the correction signal should to be re-interpolated to the current sample timing.

Similarly, each received uncorrected probe position signal is corrected by interpolating the long-term average values stored by controller 62. Controller 62 uses the known location for each received value to select two or more stored long term values to interpolate to arrive at a correction for the received value that is then subtracted from the received value to provide the corrected probe position signal value.

It should be noted that the actuator mechanism that moves the sample relative to the scanning tip could be constructed from a single xyz actuator or a plurality of individual actuators. Accordingly, the term actuator as used herein is defined to include any mechanism that produces relative motion of the tip and sample regardless of the number individual drives or sub-actuators.

The above-described Summary of the Invention and embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A scanning probe microscope comprising:
   a probe mount adapted to receive a probe having a tip that moves in response to an interaction between said tip and a local characteristic of a sample, said probe being mounted on a cantilever arm;
   an actuator that moves said probe tip relative to said sample in three directions, said actuator executing a repetitive motion, characterized by a repetitive motion frequency, in one of said directions, and causing a relative change in position between said sample and said probe tip in a second one of said directions;
   a probe position signal generator that generates a probe position signal indicative of a position of said probe tip relative to said cantilever arm;
   a probe signal correction generator that generates a corrected probe position signal by correcting said probe position signal for errors introduced by said repetitive motion; and
   a controller that maintains said probe tip in a fixed relationship with respect to said sample in said second one of said dimensions based on said corrected probe position signal.

2. The scanning probe microscope of claim 1 wherein said probe signal correction generator measures a component of said probe position signal for at least one harmonic of said repetitive motion frequency and generates a correction signal based on said components.

3. The scanning probe microscope of claim 1 wherein said probe signal correction generator measures an average value for said probe position signal at each of a plurality of predetermined positions along said first direction.

4. The scanning probe microscope of claim 3 wherein a correction factor based on said measured average values is subtracted from said probe position signal to generate said corrected probe position signal.

5. The scanning probe microscope of claim 3 wherein said controller samples said probe position signal at a sampling frequency that is an integer multiple of said repetitive motion frequency and wherein said average values are averages of said sampled values.

6. The scanning probe microscope of claim 3 wherein said controller samples said probe position signal at a sampling frequency that is not an integer multiple of said repetitive motion frequency and wherein said average values are averages of interpolated values of said sampled values.

7. A method for operating a scanning probe microscope having:
   a probe mount adapted to receive a probe having a tip that moves in response to an interaction between said tip and a local characteristic of a sample, said probe being mounted on a cantilever arm; and
   an actuator that moves said probe tip relative to said sample in three directions, said actuator executing a repetitive motion, characterized by a repetitive motion frequency, in one of said directions, and causing a relative change in position between said sample and said probe tip in a second one of said directions,
   said method comprising:
   generating a probe position signal indicative of a position of said probe tip relative to said cantilever arm;
   correcting said probe position signal for errors introduced by said repetitive motion; and
   maintaining said probe tip in a fixed relationship with respect to said sample in said second one of said dimensions based on said corrected probe position signal.

8. The method of claim 7 wherein correcting said probe position signal comprises measuring a component of said probe position signal at a harmonic of said repetitive motion frequency.

9. The method of claim 7 wherein correcting said probe position signal comprises measuring an average value for said probe position signal at each of a plurality of predetermined positions along said first direction.

10. The method of claim 9 wherein a correction factor based on said measured average values is subtracted from said probe position signal to generate said corrected probe position signal.

11. The method of claim 9 wherein said probe position signal is sampled at a sampling frequency that is an integer multiple of said repetitive motion frequency and wherein said average values are averages of said sampled values.

12. The method of claim 9 wherein said probe position signal at a sampling frequency that is not an integer multiple of said repetitive motion frequency and wherein said average values are averages of interpolated values of said sampled values.

* * * * *